July 21, 1970 H. BOSMA 3,521,195

JUNCTION CIRCULATOR WHEREIN EACH ARM IS COUPLED TO THE FERROMAGNETIC BODY AT TWO PLACES

Filed Nov. 12, 1968 2 Sheets-Sheet 1

INVENTOR.

HENDRIK BOSMA

BY

Frank R. Trifari

AGENT

| n. | k | $\alpha$ | p |
|---|---|---|---|
| 1 | 1 | $\pi$ | + |
| 2 | 1 | $\frac{\pi}{2}$ | + |
| 2 | 2 | $\pi$ | − |
| 3 | 1 | $\frac{\pi}{3}$ | + |
| 3 | 2 | $\frac{2\pi}{3}$ | − |
| 3 | 3 | $\pi$ | + |
| 4 | 1 | $\frac{\pi}{4}$ | + |
| 4 | 2 | $\frac{2\pi}{4}$ | − |
| 4 | 3 | $\frac{3\pi}{4}$ | + |
| 4 | 4 | $\pi$ | − |

INVENTOR.
HENDRIK BOSMA
BY
Frank R. Trifari
AGENT

United States Patent Office 3,521,195

Patented July 21, 1970

3,521,195

JUNCTION CIRCULATOR WHEREIN EACH ARM IS COUPLED TO THE FERROMAGNETIC BODY AT TWO PLACES

Hendrik Bosma, Emmasingel, Eindhoven, Netherlands, assignor, by mesne assignments, to U.S. Philips Corporation, New York, N.Y., a corporation of Delaware Filed Nov. 12, 1968, Ser. No. 775,024
Claims priority, application Netherlands, Nov. 23, 1967, 6715902
Int. Cl. H01p *1/32, 5/12*
U.S. Cl. 333—1.1 1 Claim

ABSTRACT OF THE DISCLOSURE

A junction circulator using ferromagnetic discs has at least three input ports each coupled to at least two points of the circulator. The two points are a selected distance apart on the circulator. Thus, undersired modes within the circulator will be suppressed because of phase cancellation.

The invention relates to a so-called junction circulator.

In known devices of this kind a ferromagnetic body, for example, of ferrite magnetically biased in a direction at right angles to the plane going through the transmission lines is provided at the crossing of at least three transmission lines, for example, tape lines or hollow conductors. The places where the transmission lines are connected to the circulator proper are termed connecting gates. In the known devices these gates are coupled with the electro-magnetic field in the ferrite body at places located rotation-symmetrically along the periphery of the ferrite body in a plane at right angles to the direction of prepolarisation.

A circulator is characterized in that the energy supplied to a connecting gate is transmitted, if correctly adapted, only to the next-following gate, the energy supplied to the next gate is transmitted only to the next further gate, and so on.

The operation of a circulator is based on the fact that both left-rotating and right-rotating electro-magnetic waves may occur in the body, which waves together provide a standing-wave pattern. With a three-gate circulator the third gate is insulated during the transmission of energy from a first gate to a second gate, so that no energy can be derived from said third gate. The wave pattern adjusts itself so that a node of the electric field appears at the third gate.

However, in practice, under given conditions, some energy may be transmitted to the insulated gate, for example, when the frequency differs fairly considerably from the working frequency proper. The bandwidth of the circulator is thus restricted.

Investigations have shown that given undesirable modes of oscillation have a disturbing effect. It has been found particularly that various modes of oscillation are possible. In general the electric field will be sinusoidally distributed along the edge of the ferrite body with each mode of oscillation. This distribution exhibits a small $n$-fold periodicity. For example, there is a mode of oscillation in which the distribution along the periphery comprises a single period of a sine function, a further mode of oscillation in which the distribution comprises two periods of a sine function and so on.

The modes of oscillation have each a resonant frequency at which they are most likely to be produced. This resonant frequency is different for the various modes of oscillation. However, the frequency difference is not very great so that modes of oscillation having an adjacent resonant frequencies may have a disturbing effect.

This will certainly occur if circulators having a large effective bandwidth have to be constructed.

A three-gate circulator may be constructed so that circulation occurs in the mode of oscillation in which $n=1$. When supplying energy to a given gate, the mode of oscillation in which $n=2$ may also be excited, which probability of occurrence is greater, the nearer the frequency of the exciting energy is to the resonant frequency of the latter mode. The direction of circulation of the latter mode is opposite that of the desired mode of oscillation ($n=1$). Through the mode of oscillation in which $n=2$ energy is transmitted to the "insulated" gate and for this reason this mode of oscillation is undesirable.

Conversely, the circulator may be constructed for operating in the mode of oscillation in which $n=2$, in which case the mode having $n=1$ has to be considered as being undesirable.

The invention particularly relates to a device for suppressing undesirable modes of oscillation having $n$-fold periodicity in a circulator.

According to the invention each gate is coupled with the electro-magnetic field in the ferro-magnetic body not at one place only as in the known circulators but at two places whose angular distance measured along the periphery in radians is equal to $k\pi/n$, in which $k$ is an integral number equal to or smaller than $n$ and at the two places coupling is in phase when $k$ is an odd number, in phase opposition when $k$ is an even number.

This arrangement is such that, when energy is supplied to a gate of the circulator, the undesirable wave mode is excited at two places, but in phase opposition so that the effects neutralise each other and the gate is therefore not actually coupled with the undesirable mode of oscillation.

The invention will be described more fully with reference to the drawing.

Herein FIG. 1 is a schematic half-sectional view of a known non-balanced three-gate circulator;

Figure 1:
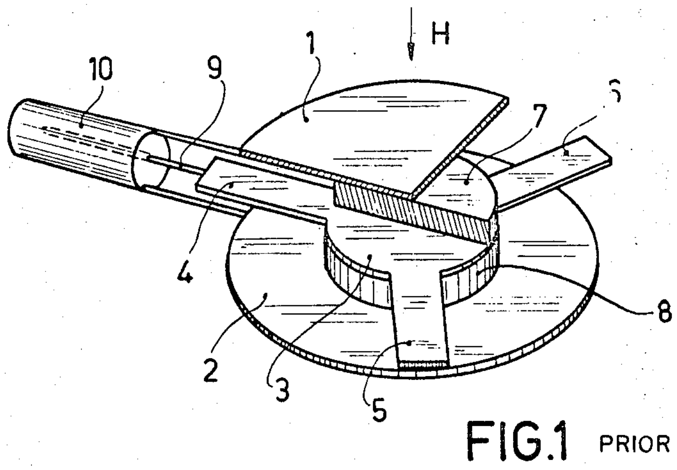
FIG.1 PRIOR ART
Figure 2:
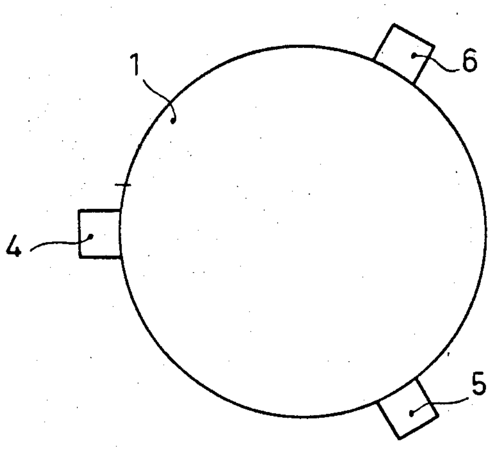
FIG.2 PRIOR ART
FIG. 2 is a plan view thereof.

The circulator comprises a conductive upper plate 1, a lower plate 2, and a central plate 3 having three connecting strips 4, 5 and 6, which are evenly distributed along the periphery. Between the plates two disc-shaped bodies 7 and 8 of ferrite are arranged; they are magnetically biassed in the direction of the arrow H. The strips 4, 5 and 6 form the connecting gates of the circulator, to which transmission lines, in this case concentric lines, can be connected as is indicated at the gate 4. The inner conductor 9 of the concentric line 10 is connected to the strip 4, and the outer conductor 10 is connected below and above to the plates 1 and 2.

Figure 3:
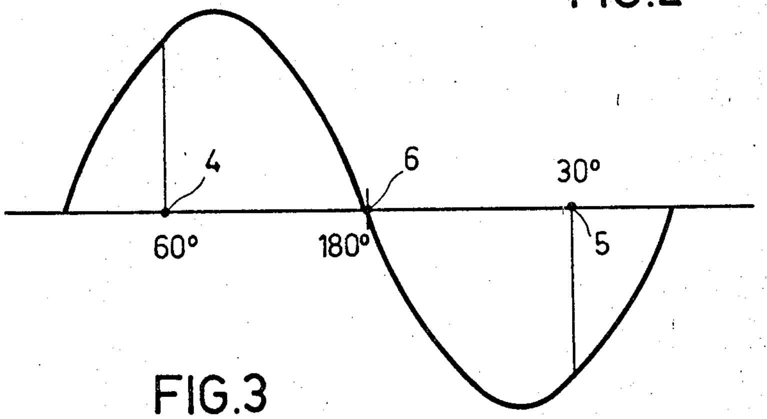
FIG. 3 is a graph of the electric field within the embodiment of FIGS. 1 and 2.

Assume that the circulator is arranged to operate in the mode of oscillation having single periodicity ($n=1$), in which the electric field is sinusoidally distributed along the peripheries of the ferrite bodies 7 and 8, as is illustrated in FIG. 3. If energy is transmitted from the gate 4 to the gate 5, the electro-magnetic field adjusts itself automatically so that the insulated gate 6 is located at the node in the electric field (180°), and the gates 4 and 5 are located at 60° and 300° respectively along the periphery. However, modes of oscillation having $n$-fold periodicity will also be excited, the distribution of which along the periphery of the electric field may in general be given by $\sin n(\varphi+\psi)$, wherein $\varphi$ is the co-ordinate of the variable angular distance and $\psi$ is a phase angle, $\psi$ depending upon the place of the supply. In this case the most disturbing mode of oscillation is that having double periodicity ($n+2$).

In the arrangement according to the invention, the gates each comprise two sub gates, that is to say, each of them is coupled with the field in the ferrite body at two places, the angular distance measured along the periphery being such that with respect to the undesirable mode the supply is in phase opposition so that the supplies counteract each other.

When the angle between the two coupling places is equal to $\alpha$ and the coupling occurs in the same phase, this is fulfilled when $n\ \alpha$ is an odd-numbered multiple of $\pi$, that is to say:

$$\alpha = k\frac{\pi}{n}$$

wherein $k$ is an integral odd number equal to or smaller than $n$. When coupling with the ferrite body occurs in phase opposition, $n\alpha$ has to be an even numbered multiple of $\pi$, so that $$\alpha = \frac{k\pi}{n}$$

wherein $k$ is an even number.

Figures 4, 5:
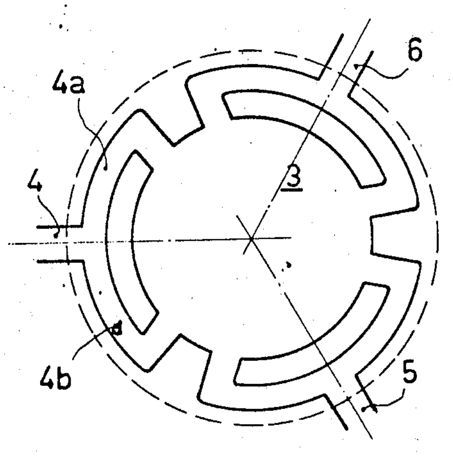
FIG. 4 is a table of phase relationships in the embodiment of the invention.
FIG. 5 shows a top view of an embodiment of the invention.

In the table of FIG. 4 this is indicated in detail for various values of $n$ and $k$. In the fourth column the phase $p$ of the coupling is indicated, + means co-phase coupling and − means anti-phase coupling.

If the undesirable mode of oscillation exhibits double periodicity ($n=2$), two possibilities arise. In the first place the angle between the coupling places may be equal to 90°, in which case the coupling has to occur in the same phase.

FIG. 5 shows an example of a possible form of the central plate of a non-balanced tape line circulator for this case. The upper and lower plates overlap the central plate, as is indicated by the circle in broken lines. The gate 4 is connected to the central plate 3 through coupling strips 4*a* and 4*b* of equal lengths. Similarly, gates 5 and 6 are so coupled. By suitable proportioning of these coupling strips, they may be employed in known manner as an impedance transformer for matching the circulator to the connected supply lines.

The other possibility is that the angle between the coupling places is equal to 180°, which means that the coupling places are located diametrically opposite each other. However, the coupling with the ferrite body then has to occur in phase opposition, which gives rise to difficulties particularly in non-balances tape line circulators, because the supply has to be made through phase shifting members.

In balanced tape-line circulators which comprise only two plates and a single ferrite body arranged between them the supply in phase opposition is, in principle, less objectionable since this may be achieved by crossing the supply conductors, but even in this case supply in phase is preferred.

Experiments have shown that by splitting up the connecting gates the circulation properties of the desirable mode of oscillation are not adversely affected. The useful, relative bandwidth of a circulator may be enlarged by carrying out said measure from about 25% to 35 to 40%.

What is claimed is:

1. A device for suppressing undesirable modes of oscillation in a junction circulator comprising at least one disc-shaped ferromagnetic body biased in a direction at right angles to the major faces of the discs, which circulator comprises at least three connecting gates, which are coupled with the ferromagnetic body at places lying rotation-symmetrically along the periphery of the disc-shaped ferromagnetic body in a plane parallel to the major faces of the disc, whilst the undesirable oscillation modes exhibit $n$-fold periodicity along the periphery of the body, characterized in that each gate is coupled with the ferromagnetic body at two places, the angular distance of which, measured along the periphery in radians, is equal to $k\pi/n$, wherein $k$ is an integral number equal to or smaller than $n$ and in which the coupling at the two places occurs in phase when $k$ is an odd number and in phase opposition when $k$ is an even number.

References Cited

UNITED STATES PATENTS 3,335,374 8/1967 Konishi ---------- 333—1.1

HERMAN KARL SAALBACH, Primary Examiner

P. L. GENSLER, Assistant Examiner

U.S. Cl. X.R.

333—83